Aug. 27, 1957     A. GHIGLIERI     2,804,065
CIRCULAR CUTTING OF MASONRY SLABS
Filed April 18, 1955     4 Sheets-Sheet 1
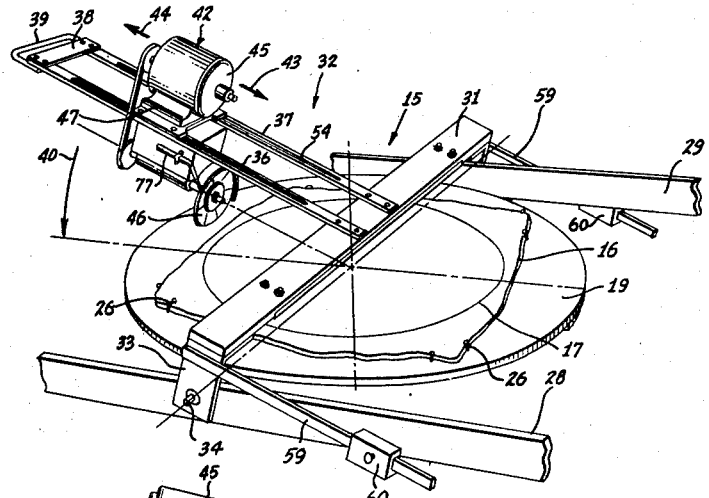
ANGELO GHIGLIERI,
INVENTOR.
Huebner, Beehler,
Worrel & Herzig.
ATTORNEYS.

Aug. 27, 1957 A. GHIGLIERI 2,804,065
CIRCULAR CUTTING OF MASONRY SLABS
Filed April 18, 1955 4 Sheets-Sheet 2
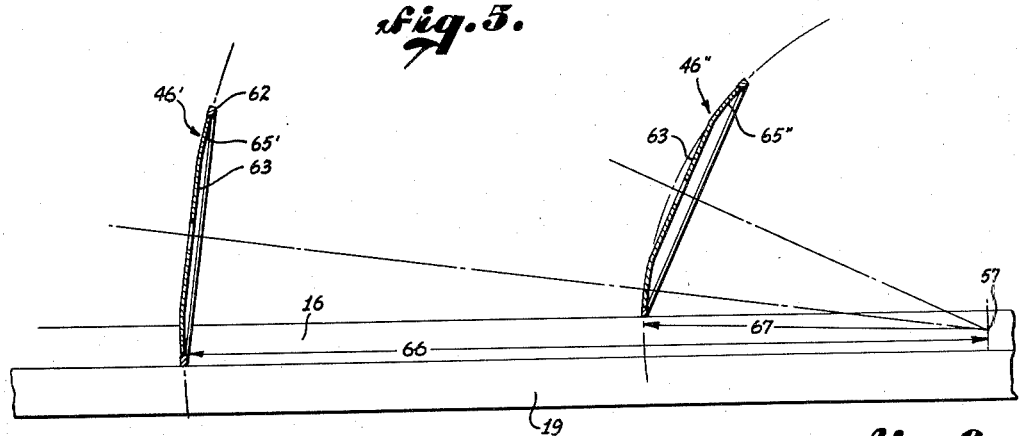
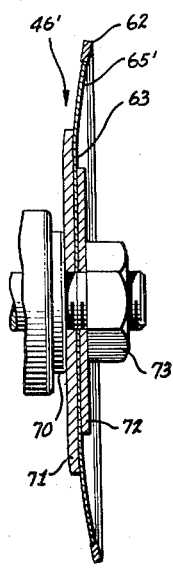
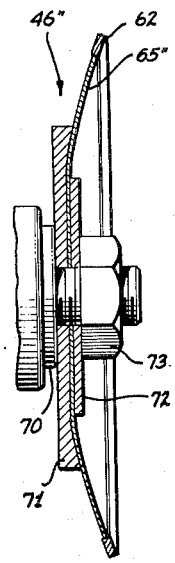
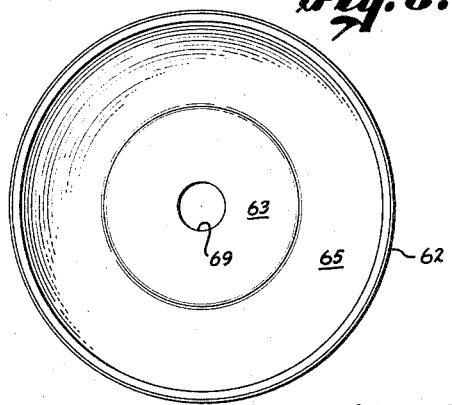
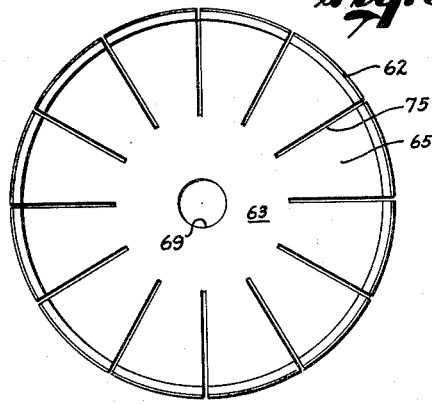
ANGELO GHIGLIERI,
INVENTOR.
Huebner, Beehler,
Worrel & Herzig.
ATTORNEYS.

Aug. 27, 1957  A. GHIGLIERI  2,804,065
CIRCULAR CUTTING OF MASONRY SLABS
Filed April 18, 1955  4 Sheets-Sheet 3
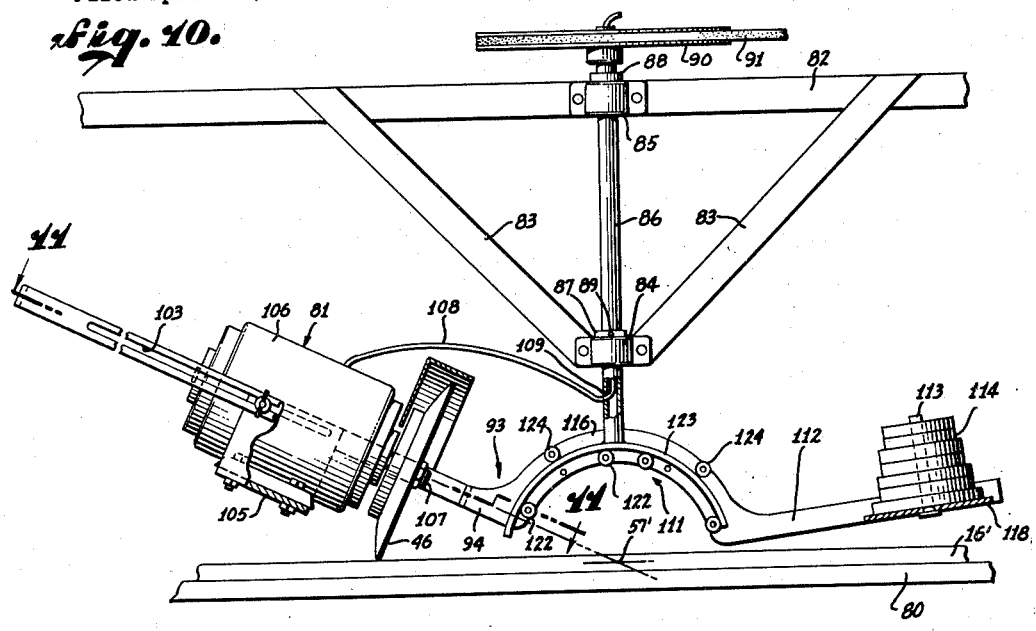
ANGELO GHIGLIERI,
INVENTOR.
Huebner, Beehler,
Worrel & Herzig.
ATTORNEYS.

Aug. 27, 1957     A. GHIGLIERI     2,804,065
CIRCULAR CUTTING OF MASONRY SLABS
Filed April 18, 1955     4 Sheets-Sheet 4
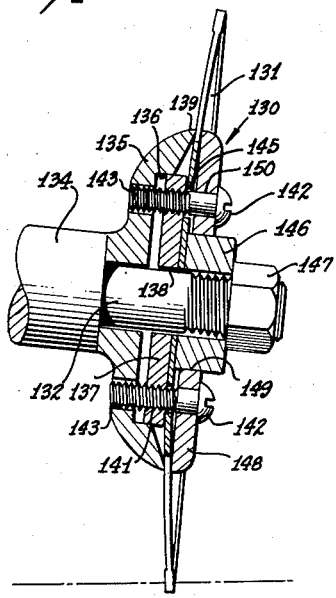
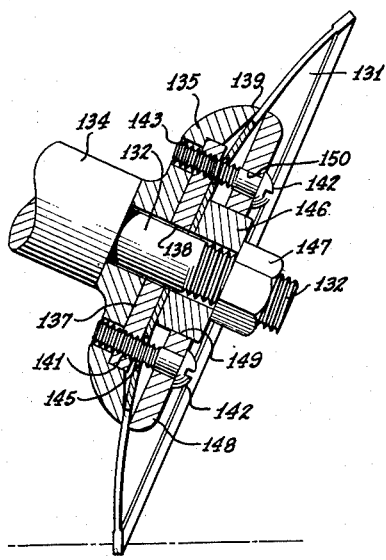
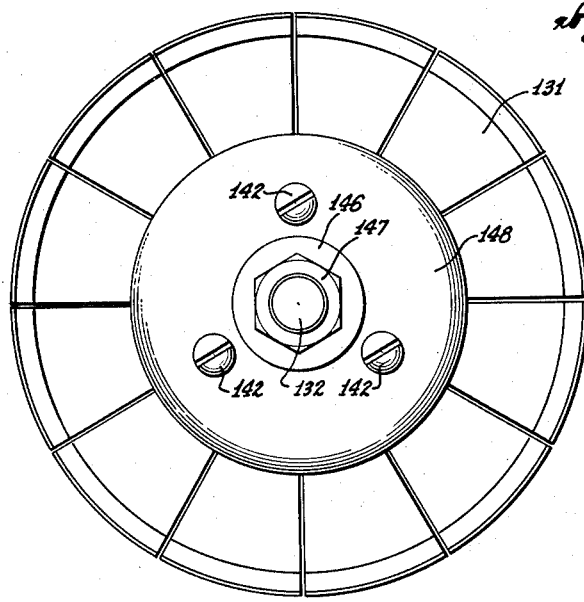
ANGELO GHIGLIERI,
INVENTOR.
Huebner, Beehler,
Worrel & Herzig.
ATTORNEYS.

2,804,065
Patented Aug. 27, 1957

2,804,065
CIRCULAR CUTTING OF MASONRY SLABS

Angelo Ghiglieri, Los Angeles, Calif., assignor of one-third to Frederick B. Cordova, Jr., South San Gabriel, and one-third to George Aspetti, Los Angeles, Calif.

Application April 18, 1955, Serial No. 502,163

4 Claims. (Cl. 125—14)

This invention is a method and apparatus for cutting materials along a curved line. The method and apparatus of this invention are especially advantageous for cutting to a circle stone, brick, marble, tile, and the like, herein referred to collectively as masonry materials, and for cutting other sheet material, e. g. wood, steel and glass.

Heretofore it has been the practice for cutting circular forms of masonry materials, e. g. a slab of marble, to cut the slab with a flat masonry blade along straight cuts tangent to the desired circle and then to smooth off the small vertexes between adjacent tangents by filing or grinding operations. This prior method for cutting a slab is time consuming and tedious, and the circles of the slabs so formed are usually not true circles. Band saws and wire saws have been employed for cutting slabs of masonry materials along curved lines, but such saws leave a rough edge and following the cutting operation it is necessary to smooth the edges of the material by finish grinding operations.

It is an object of this invention to provide a method and apparatus for cutting slab material along a smooth curved line directly, rather than forming the slab into a many-sided polygon and then grinding the projecting angles in the edge of the slab down to a curved line.

Another object of the invention is to provide a masonry blade which is so shaped that it will not bind in a curved cut when the blade is rotated in the cut.

Further objects and advantages of the invention will appear during the course of the following part of this specification, wherein the details of construction and mode of operation of two embodiments of the invention are described with reference to the accompanying drawing, in which:

Fig. 1 is a perspective view of an apparatus embodying my invention,

Fig. 2 is a representation of the apparatus shown in elevation with certain component parts thereof being in cross section, Fig. 3 is a section taken substantially on line 3—3 of Fig. 2, Fig. 4 is a detailed section taken on line 4—4 of Fig. 2, Fig. 5 is a representation of two masonry blades of this invention shown in vertical section and positioned at different distances from a point in a common axis of rotation appearing at the extreme right hand portion of the figure, Fig. 6 is an end portion of a shaft shown in elevation and on which is mounted a masonry blade having a configuration corresponding to that of the blade contained in the left hand portion of Fig. 5, the blade being shown in cross section, Fig. 7 is a view similar to that of Fig. 6, but including the masonry blade illustrated in the right hand portion of Fig. 5, Fig. 8 is a plan view of one face of a masonry blade constructed according to the present invention, Fig. 9 is a plan view of one face of a modified form of a masonry blade constructed according to the invention, Fig. 10 is an elevation of another embodiment of the apparatus of this invention, with certain parts of the apparatus being shown in cross section, Fig. 11 is a transverse section taken substantially along line 11—11 of Fig. 10, Fig. 12 is a perspective view of a curved plate which constitutes a component of the pivot assembly of the embodiment shown in Fig. 10, Fig. 13 is a section through the axis of a modified form of blade mounting assembly, Fig. 14 is a view similar to that of Fig. 13, but showing the blade mounting assembly in an adjusted position for flexing the masonry blade to a greater arc than that shown in Fig. 13 for cutting slabs into circles of less diameter, and Fig. 15 is a plan view of the modified form of blade mounting assembly.

Referring to the drawings in detail and with the use of reference numerals, an embodiment of the apparatus of my invention is shown in Fig. 1 and designated generally by reference numeral 15. The apparatus 15 supports a slab 16 to be cut along a circle 17. The circle 17 is represented as a mark on the slab 16 and this circular mark has been shown only for convenience of reference in this description. In practice it is not necessary to draw a circle on the slab for, as will be made clear in the following description, the apparatus may be set to cut a circle of any desired size without need for registration with a circular mark on the slab.

Apparatus 15 comprises a horizontally disposed turntable 19, which is mounted at the center of its under side on the upper end of a vertical shaft 20 as with a flanged collar 21 fastened by bolts 22 to the turntable. The shaft 20 carries a pulley 23 which is rotatably driven through a belt 24 by a motor 25. Thus the motor causes rotation of the turntable. Should the turntable be constructed of wood, clamping of the slab 16 on the top surface of the turntable may be accomplished simply and effectively by driving nails 26 into the turntable and bending the nails over an edge of the slab.

Extending on opposite sides of the turntable and disposed generally in the plane of the turntable are two beams 28 and 29, which are substantially parallel to each other and which constitute parts of a frame structure for supporting the moving elements of the apparatus. A complete frame structure having braces and upright elements is not included in the drawing. I have chosen to illustrate the apparatus without showing a complete supporting frame structure, because the details of construction of a suitable supporting frame structure are not material to the scope of the invention nor to an understanding thereof. Therefore, I consider it sufficient for the purpose of this description that only the beams 28 and 29 be illustrated and that it be understood that they represent a suitable supporting frame structure.

Spaced above the turntable and extending transversely of the beams 28 and 29 is a cross bar 31 constituting the cross member of a T-frame designated generally by reference numeral 32. The cross bar has an angle piece 33 fastened on each end thereof and these angle pieces are pivotally mounted on respective beams 28 and 29 by pins 34.

The arm or stem portion of the T-frame 32 comprises a pair of parallel rails 36 and 37 secured at one end to the cross bar 31 so as to extend at right angles from the cross bar. At the outer ends of the rails are a cross piece 38 and a handle bar 39, which serve to secure the rails in a common plane and as a unitary structure. The handle 39 provides a means by which the rails may be grasped conveniently and pressed down to swing the T-frame on its pivots 34 in the direction of arrow 40.

Slidably mounted on the rails is a motor and blade assembly 42 which may be moved on the rails in the directions of arrows 43 and 44 and set in a position at a predetermined distance from the cross bar 31 for cutting the slab to a circle of desired size. The motor and blade assembly consists essentially of a motor 45 and a masonry blade 46 rotatably driven by the motor.

In apparatus 15 the motor 45 is mounted on a base 47. On the under side of the base is a block 48 having a shaft 49 rotatably mounted on its under side. The shaft 49 extends in a direction substantially parallel to the rails 36 and 37 and that end of the shaft which is nearer to the cross bar supports the blade 46. The shaft and blade are rotatably driven by the motor 45 through a belt 50 which drivingly connects a shaft pulley 51 to a pulley 52 on the motor.

To permit sliding of the motor and blade assembly on the rails 36 and 37 and to provide a simple structure by which the assembly may be set or fixed at a position where the blade will cut the slab to a circle of desired size, each rail has a longitudinally extending slot 54 formed therein. The base of the motor rests on and spans the two rails and the slots 54 accommodate bolts 55 by which the motor and base assembly may be secured at a desired position on the rails. Such mounting of the motor and blade assembly on the rails results in positioning the shaft 49 in a direction such that the axis of the shaft is disposed in a plane which is equidistant between the rails.

Mounting of the shaft 49 in the above described relation to the rails 36 and 37 permits positioning of the shaft and the blade 46 with respect to the slab 16 in a way such that the blade will cut through the slab along circle 17 to form a substantially cylindrical side wall substantially perpendicular to each of the faces of the slab. Most of the present day uses of circular slabs of masonry materials are those of slabs having their edges or side walls shaped as just described, and accordingly, I have designed apparatus 15 with the aim of providing an apparatus of simple construction and suitable for use in cutting slabs to circular pieces having such side walls. Furthermore, of the more common uses to which circular slabs are put, by far the greatest number thereof require slabs of a limited range in thickness. I find that in practice, most of the cells for circular slabs are for slabs of about one inch thick, and accordingly in keeping with my desire to provide an apparatus of simple construction, I have designed the apparatus 15 with the aim that it serve its purpose well at least for cutting circular slabs of a limited range in thickness.

With this aim of simple construction in mind, the support for shaft 49 (i. e. block 48) does not permit adjustment of the shaft to selected positions at various distances from the plane of the rails 36 and 37, and also the cross bar 31 may not be raised or lowered with respect to the supporting beams 28 and 29. This matter of adjustment of the shaft 49 and cross bar 31 to selected distances from their respective supports is being brought out to better explain how the shaft 49 should preferably be mounted to cause the blade 46 to cut the slab 16 along a cut which it substantially perpendicular to the faces of the slab.

Although I have described the shaft 49 as the same is positioned in relation to the rails, such relationship in apparatus 15 is a mere consequence of my alignment of the axis of the shaft 49 with a reference point located in the slab 16. Such reference point appears in Fig. 2 at 57 and is located midway between the faces of the slab 16 and in the line of the axis of shaft 20. Also, the pins 34 which pivotally mount the T-frame 32 on the supporting frame-beams 28 and 29 are axially aligned with the reference point 57.

To keep the blade 46 spaced above the slab 16 except during cutting operations, apparatus 15 includes weight means comprising lever arms 49 secured at one end of each to respective angle pieces 33, and extended in a direction from the cross bar 31 opposite to the rails 36 and 37. These lever arms have weights 60 which are slidingly adjustable on the lever arms for balancing the T-frame on its pivots 34 and requiring an operator to press down on handle 39 for engagement of the masonry blade 46 with the surface of the slab 16.

The blade 46 is shaped, according to this invention, to provide for circular and substantially cylindrical cutting of the slab 16. In Figs. 5 to 7, two blades are shown and these are designated by reference numerals 46' and 46" respectively. These blades are formed from conventional abrasive masonry blades which are circular and flat. Such conventional blades are well known to those skilled in the art of cutting masonry materials as comprising a flat metal disc having a rim 62 bonded around the circumference of the disc, the rim 62 being constituted of a metal with small diamonds homogeneously dispersed therein.

The blades 46' and 46" are formed from conventional flat blades into dish shaped forms having a substantially flat medial portion 63 and an arcuate marginal portion 65' for the blade 46' and an arcuate marginal portion 65" for the blade 46". The radial dimension of these arcuate marginal portions is greater than the thickness of the slab to be cut. To obtain the substantially cylindrical cutting slabs as above described I employ different blades for cutting circles of different sizes. The blade 46' is designed for cutting circles of relatively large radius shown by dimension 66 from reference point 57 and thus the marginal portion 65' is shaped to conform to a section of a sphere of radius 66. The blade 46" is designed to cut circles of relatively small radius (designated by dimension 67) and thus the marginal portion 65" is shaped to conform to a section of a sphere having a radius equal to dimension 67. It is not necessary, however, to provide an infinite number of differently curved blades for cutting circles of all sizes, for in practice it is found that one blade such as blade 46' will serve well, without binding in a cut, for cutting circles which are slightly smaller or slightly greater than the circle of radius 66.

Each blade has an arbor hole 69 for receiving the end of shaft 49. The shaft has a collar 70 non-rotatably fixed around it. Next to the collar 70 and on the shaft is placed a circular plate 71 to serve as a back support for the blade 46, such plate being slightly dished to conform to the curvature of the blade. The masonry blade is then placed on the shaft and another supporting plate 72, of smaller diameter than plate 71, is then placed on the shaft. The end of the shaft is screw threaded to accommodate a nut 73 which serves to tighten the blade and its supporting plates against the collar 71 whereby the blade will be rotatably driven by the shaft.

In Figs. 8 and 9 two modifications of blades of my invention are shown, the one in Fig. 8 being like those of Figs. 5 to 7, while the blade shown in Fig. 9 is provided with a plurality of radially extending slots 75 which extend through the rim 62 and through the curved marginal portion 65 of the blade to form a segmented blade. Since the blades used in practicing this invention are of the abrasive type, a stream of water is directed on the blade or in the cut being made in a slab of masonry material, and for this purpose the motor and blade assembly carries the nozzle end of a hose 77 for spraying water on the blade, and a shield 78 is provided over the blade to protect an operator against spray of water from the blade.

In describing the operation of apparatus 15, let it be assumed that it is desired to cut the slab 16 to a circle 17. An operator will first select a blade 46 which has its marginal portion 65 conforming to a section of a sphere approximately equal in radius to the radius of the desired circle 17. Such blade is then fixed on the inner end of shaft 49 with supporting plates 71 and 72 and tightened by nut 73. The motor and blade assembly is then set to a position on the rails such that the rim of the blade 46 will be spaced from the center of the turntable by a distance which is equal to the radius of the circle 17. Turntable 19 is then rotated by actuating motor 25 and the blade 46 is rotated by actuating motor 45. By pressing downwardly on handle 39 the rotating blade will engage the top surface of the slab 16 at a point on the circle 17, and as the slab 16 is rotated the blade 46 will cut deeper and deeper into the slab until the slab is cut through.

In Fig. 5 I have attempted to illustrate the relative positioning of the blade 46 with respect to the slab for cutting the slab along a cut which will be as nearly at right angles to the two opposite faces of the slab as is possible. As explained above, the apparatus 15 is primarily designed to cut slabs of a limited range in thickness and thus the height of the block 48 and the height of the angle pieces 33 from the pivots 34 are such that the blade will be positioned with its marginal portion 65 substantially perpendicular to a medial horizontal plane through the slab. In this connection I desire to have it understood that I contemplate forming the block 48 and angle pieces 33 so that they may be lengthened or shortened to raise or lower the cross bar and rails 36 and 37 from the table, and a form of apparatus for raising and lowering the support for the motor and blade assembly above the top surface of the slab of masonry material is next described herein.

The apparatus shown in Figs. 10 to 12 inclusive is an embodiment of my invention in which the slab of masonry material 16' to be cut into a circle is maintained stationary on a horizontally disposed table or other suitable support 80, while a motor and blade assembly 81 for cutting the slab into a circular form is rotated above the slab support around a vertical axis.

This form of my invention includes a frame structure disposed above the support 80 and comprises a horizontal beam 82 and brace members 83. The brace and beam members secure bearing blocks 84 and 85 in axial alignment with each other for rotatably supporting a shaft 86. The shaft is kept from sliding downwardly through the bearing blocks by means of collars 87 and 88, which are adjustably fixed around the shaft as by set screws, one of which is shown at 89. At its upper end the shaft has a pulley 90 fixed thereto so as to impart rotation to the shaft when driven by a belt 91 connected to a motor, not shown.

Mounted on the lower end of a shaft is an arm assembly 93 for carrying the motor and bade assemby 81. The arm assembly 93 comprises two spaced apart plate strips 94 and 95, which are bent as at locations 96 and 97 to provide a pair of parallel rails 98 and 99. These rails are joined together at the ends thereof remote from the shaft 86 by a transversely extending member 100 and corner gussets 101 serving to rigidly maintain the rails in a common plane.

Each of the rails has a longitudinally extending slot 103 formed therein for slideably receiving bolts 104, which project outwardly from opposite side flanges of a base 105 for supporting an electric motor 106 intermediate the rails. The motor 106 has its shaft 107 projecting in a line disposed in a plane passing through the axis of the arm assembly, and that end of the shaft which projects in the direction of shaft 86 carries a masonry blade 46 fixed on the shaft whereby the motor will rotate the blade.

To provide for electrical connection of the rotary blade and motor assembly to a source of power, the shaft 86 is made hollow, and electric leads 108 for the motor are passed into the shaft through holes 109 in the shaft for extending the leads axially through the shaft to the top end of the shaft for connection through a conventional rotary terminal box (not shown) to a stationary source of power.

As in the previously described apparatus 15, the arm assembly 93, which corresponds in function to the T-frame 32 of apparatus 15, is adapted to be moved as a lever in a vertical plane about a reference point 57' located midway between the opposite faces of slab 16' and on the vertical axis of the circular form to be cut. To this end the arm assembly 93 is constructed to provide a pivot assembly 111 from which the lever arms of the pivoted arm assembly 93 extends in opposite directions. The rails 98 and 99 comprise one such lever arm of assembly 93 and the other such lever arm is designated by reference numeral 112. The lever arm 112 constitutes a weight arm for balancing the rails 98 and 99 and the motor and blade assembly 81. Thus lever arm 112 includes an upwardly extending pin 113 for accommodating and holding in position a desired number of ring weights 114.

The plate strips 94 and 95 which form the rails 98 and 99 respectively, also form opposite side members 116 and 117 of the pivot assembly 111, and form the weight lever arm 112 in which they are secured to a transversely extending plate 118 for mounting the pin 113 and weights 114. In the pivot assembly 111, the side members 116 and 117 are arcuate in shape whereby they are disposed in an imaginary cylinder passing horizontally of the apparatus with the axis thereof containing reference point 57'. The lever arms of the arm assembly, i. e. the rails 98 and 99 on the one hand and the weight arm 112 on the other hand, extend outwardly and upwardly from opposite ends of the side members 116 and 117 of the pivot assembly, whereby the horizontal plane of the rails 98 and 99 passes through reference point 57' and such point is spaced below the ends of the side members.

The side members 116 and 117 are parallel to each other and support a plurality of axles 120 extending between and transversely of the side members. The ends of the axles passing through the side members are secured in place by nuts 121. These axles rotatably support rollers 122. The rollers in turn support a plate 123 which as best shown in Fig. 12 is curved to conform to a section of a right circular cylinder of slightly less axial length than the space between the side members. The arcuate plate is welded or otherwise suitably fixed at the mid point of its upper surface to the lower end of shaft 86. Engageable with the upper surface of the arcuate plate are roller and axle assemblies 124 which are spaced radially from the arc of the plurality of rollers 122 by a distance sufficient to accommodate the thickness of plate 123, and thus the side members 116 and 117 and the two series of rollers 122 and 124 are rotatably mounted and held on the plate 123 to permit swinging movement of the arm assembly 93 in a vertical plane about reference point 57'.

In operation of the apparatus of Figs. 10 and 12 inclusive, the arm assembly 93 is raised above the support 80 by selective positioning of the collars 87 and 88 on the shaft 86 to a distance such that the plane of the rails 98 and 99 passes through the center point 57' of slab 16'. The motor 106 is then energized to rotate the abrasive blade 46 and that portion of the arm appearing in the left hand portion of Fig. 10 is lowered by rotation on the pivot mechanism 111 so that the rim of the blade will contact the top surface of the slab 16'. The arm assembly is then rotated about the axis of shaft 86, whereby the blade will describe a circle in the slab. Continued rotation of the arm on its vertical axis causes the blade to cut deeper and deeper into the slab with each successive rotation until the slab is cut entirely through.

Referring now to Figs. 13, 14 and 15, there is shown an assembly, designated generally by reference numeral 130, adapted to mount a masonry blade 131 on the end of a shaft 132, in a manner such that the curvature of the blade may be changed for cutting slabs to circles of different sizes.

The illustrated embodiment of the adjustable blade mounting assembly 130 includes a bearing block 134 for rotatably mounting the shaft 132, which shaft corresponds in function and construction to the shafts 49 and 107 of the previously described embodiments. The blade mounting end of the bearing block 134 has an annular flange 135 integral therewith, which is recessed in the outside end face thereof to provide a cylindrical recess 136 of circular cross section, coaxial with the shaft 132, for receiving a back plate 137 having an arbor hole 138 formed therein, which back plate is slidable in an axial direction on the shaft. From the rim of the cylindrical recess 136 the end face of the flange 135 is inclined radially outwardly to the rim 139 of the flange.

The back plate 137 has a series of spaced apart and annularly arranged openings 141 formed therein and these are screw threaded for threadably receiving bolts 142. The flange 135 is likewise provided with a series of openings 143 for receiving the ends of bolts 142, but these openings 143 are not screw threaded and are larger in diameter than the bolts so that the bolts are freely rotatable in the openings. In the illustrated embodiment there are three sets of openings 141 and 143 and bolts 142.

The masonry blade 131 is similar to the slotted blade shown in Fig. 9, and in addition to its center arbor hole it has three holes 145 aligned respectively with the holes 141 in the plate 137 for receiving the bolts 142 which are freely rotatable in the blade holes. When installed as shown in Figs. 13 to 15, the center portion of the convex face of the masonry blade is placed in face to face relation with the back plate 137. A sleeve 146 is then placed on the shaft, the sleeve being axially slidable on the shaft, and a nut 147 is threadably fitted on the end of shaft to secure the sleeve. An annular plate 148 having a center hole 149 fits around the sleeve and is provided with three holes 150 for receiving the bolts 142 which are freely rotatable in the holes 150. The outside diameter of the ring plate 148 is substantially equal to that of the flange 135 so that the blade becomes clamped between adjacent rims of the plate 148 and the flange.

From the above it will be seen that the curvature of the blade 131 may be selectively changed for the purpose of cutting slabs into circles of different diameters. For relatively large circles the blade will be flexed as shown in Fig. 13, while for cutting smaller circles the nut 147 and the bolts 142 will be turned to move the back plate 137 and sleeve 146 inwardly from the end of the shaft to flex the blade so that at least the marginal portion of the blade conforms substantially to the surface of a sphere of less radius than in the configuration of the blade shown in Fig. 13. For permitting easier flexing of the blade, the radially extending slots in the marginal portion thereof extend toward the center inwardly of the clamping rims of the flange and ring plate 148.

It is to be understood that the forms of my invention, herein shown and described, are practical and preferred examples of the same, and that changes may be resorted to within the scope of my invention, which is not limited to the details disclosed herein, but is to be accorded the full scope of the claims so as to embrace any and all equivalent structures.

Having described my invention, what I claim as new and desire to secure by Letters Patent is:

1. Apparatus for cutting material along a predetermined curved line, comprising a table for supporting the material to be cut, a frame, arm-support means spaced above the table by a distance sufficient to receive said material under and spaced below the arm-support means, an elongate arm connected at one end thereof to the arm-support means and extending in a direction substantially radially with respect to the table, a circular cutting blade rotatably mounted on the arm, driving means for rotating the blade, pivot means associated with the frame and spaced from said table for mounting the arm-support means on the frame for movement of the arm in a plane passing through the plane of the table whereby the arm may be moved to a position at which the blade contacts the table, and means for effecting relative rotation of the table and the arm on an axis substantially perpendicular to the table.

2. Apparatus according to claim 1 in which said means for effecting relative rotation is operatively associated with said table for rotating the table.

3. Apparatus according to claim 1 in which said arm-support means is rotatably mounted in the frame.

4. Apparatus for cutting a slab of masonry material of predetermined thickness along a circular path of predetermined radius, comprising a table having a flat top surface for supporting the slab, a frame independent of the table, a shaft positioned above the said surface and mounted on the said frame for rotation of the shaft on an axis perpendicular to the plane of said surface, an arm pivotally mounted on one end of the shaft proximate the said surface for rotary movement of the arm in a plane common to said axis and about a reference point in the said axis and spaced above said surface by a distance about one-half said thickness, means preventing relative rotation of the arm and shaft about the axis of the shaft, a support slideably mounted on the arm for selective positioning of the support at a predetermined distance from the shaft, a blade shaft rotatably mounted on said support and extending in a line passing through said reference point, and a circular abrasive masonry blade non-rotatably fixed on the blade shaft for rotation on the axis of the blade shaft, the marginal peripheral portion of the blade being cupped to conform to a section of the surface of a sphere of a radius approximating the said predetermined radius.

References Cited in the file of this patent
UNITED STATES PATENTS

| | | |
|---|---|---|
| 14,268 | Kern | Feb. 12, 1856 |
| 24,314 | Lemman | June 7, 1859 |
| 43,041 | Robertson | June 7, 1864 |
| 179,655 | Hogeland | July 11, 1876 |
| 617,005 | Wood | Jan. 3, 1897 |
| 1,112,250 | Bauer | Sept. 29, 1914 |
| 1,276,776 | Leeks | Aug. 27, 1918 |
| 1,426,932 | Wallace | Aug. 22, 1922 |
| 1,496,618 | Billingsly | June 3, 1924 |
| 1,660,333 | Heleman | Feb. 28, 1928 |
| 2,508,042 | Rehnberg | May 16, 1950 |
| 2,540,793 | Metzger | Feb. 6, 1951 |
| 2,633,008 | Tocci-Guilbert | Mar. 31, 1953 |
| 2,755,601 | Lux | July 24, 1956 |